United States Patent
Fink

(10) Patent No.: US 9,090,278 B2
(45) Date of Patent: Jul. 28, 2015

(54) PORTABLE CHILD SAFETY SEAT ASSEMBLY FOR USE WITH SHOPPING CARTS

(71) Applicant: Inventurous, LLC, Pittsburgh, PA (US)

(72) Inventor: Joseph M. Fink, Washington, PA (US)

( * ) Notice: Subject to any disclaimer, the term of this patent is extended or adjusted under 35 U.S.C. 154(b) by 0 days.

(21) Appl. No.: 13/927,942

(22) Filed: Jun. 26, 2013

(65) Prior Publication Data

US 2014/0191547 A1    Jul. 10, 2014

Related U.S. Application Data

(60) Provisional application No. 61/665,022, filed on Jun. 27, 2012.

(51) Int. Cl.
| | |
|---|---|
| A47D 1/10 | (2006.01) |
| B60N 2/20 | (2006.01) |
| B62B 3/14 | (2006.01) |
| B60N 2/28 | (2006.01) |

(52) U.S. Cl.
CPC ............ *B62B 3/1444* (2013.01); *B60N 2/2806* (2013.01)

(58) Field of Classification Search
CPC .... B62B 3/1444; B62B 3/144; B62B 3/1448; B62B 3/1452; B60N 2/2806; A47C 1/146; A47C 3/16; A47C 7/021
USPC .......................... 297/256.17, 380, 255, 250.1
See application file for complete search history.

(56) References Cited

U.S. PATENT DOCUMENTS

| | | | | | |
|---|---|---|---|---|---|
| 4,204,695 | A | * | 5/1980 | Salzman | 280/33.993 |
| 5,474,361 | A | * | 12/1995 | Hwang et al. | 297/380 |
| 5,611,597 | A | * | 3/1997 | Lanz | 297/256.17 |
| D380,118 | S | * | 6/1997 | Ford | D6/601 |
| 5,641,200 | A | * | 6/1997 | Howell | 297/256.17 |
| 5,810,437 | A | * | 9/1998 | Sharpe | 297/256.17 |
| 6,007,572 | A | * | 12/1999 | Baldwin | 607/114 |
| D494,770 | S | * | 8/2004 | Hillard | D6/368 |
| 7,350,788 | B2 | * | 4/2008 | Booker | 280/33.993 |

* cited by examiner

*Primary Examiner* — Milton Nelson, Jr.

(57) ABSTRACT

A portable child safety seat assembly for use with standard wire mesh shopping carts is foldable and has a seat belt that attaches to the seat assembly and removably attaches to the shopping cart.

3 Claims, 1 Drawing Sheet

PORTABLE CHILD SAFETY SEAT ASSEMBLY FOR USE WITH SHOPPING CARTS

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Most standard wire mesh shopping carts have built in child seats near the handle-end of the cart. In many instances, mothers have two young children that must be accommodated while she shops. The present invention is directed to a portable child safety seat that is light in weight, is foldable so that it can easily be carried by the mother, and can be quickly and easily attached to a standard wire mesh shopping cart. The larger child can ride in the built in child seat while the smaller child can then be safely carried in the portable child safety seat of the present invention while the mother shops.

BRIEF SUMMARY OF THE INVENTION

The portable child safety seat assembly of the present invention is designed to be used with a standard wire mesh-type shopping cart. It has a seat that rests on the bottom wall of the top section of the shopping cart and a back rest that extends in a generally vertical direction from the seat. Stringers are attached to the seat and the back rest to prevent the back rest from moving back at an angle of more than 115° relative to the seat. The safety seat assembly has a seat belt attached to the assembly at each side near where the seat and back rest meet, and the seat belt also attaches to the wire mesh of the shopping cart at each of its ends.

BRIEF DESCRIPTION OF THE SEVERAL VIEWS OF THE DRAWING(S)

DETAILED DESCRIPTION OF THE INVENTION

Figure 1:
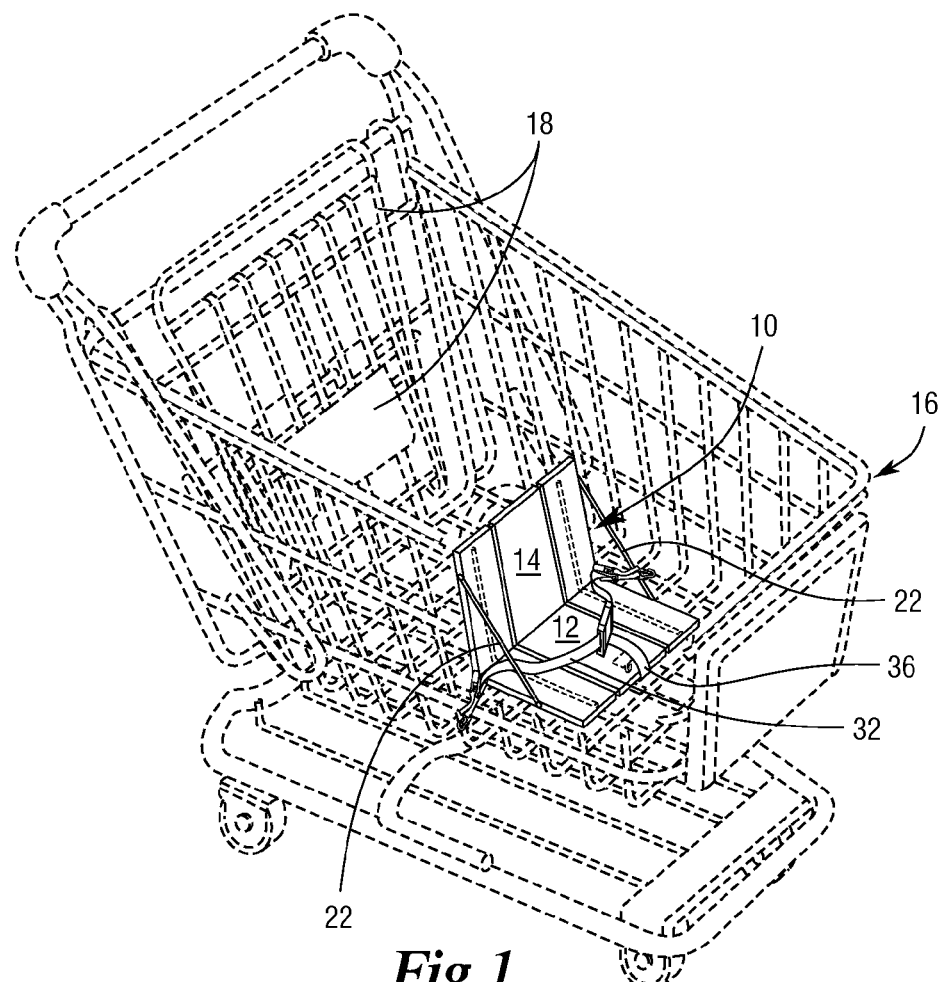
FIG. 1 is a perspective view of the portable child safety seat of the present invention in a shopping cart.
Figure 2:
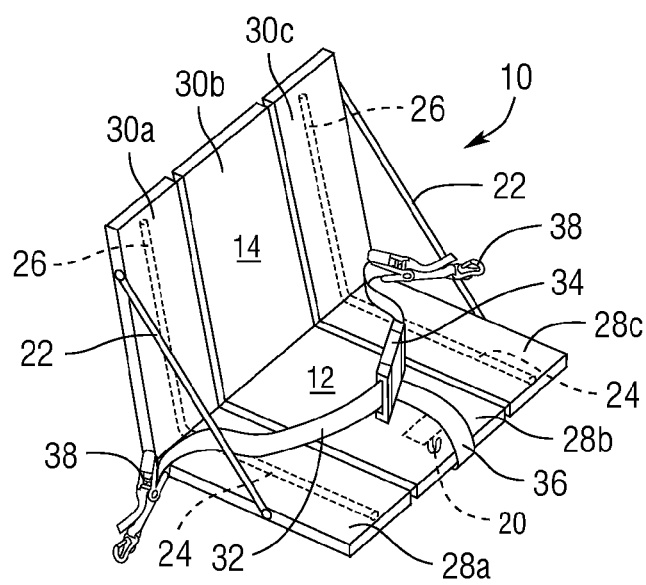
FIG. 2 is a perspective view of the seat assembly itself shown in greater detail.

As shown in FIG. 1 and FIG. 2, there is provided a portable child safety seat assembly 10 having a seat 12 and a back rest 14. FIG. 1 shows the seat assembly 10 installed in a standard wire mesh-type shopping cart 16. The shopping cart 16 has a built-in child seat 18 that folds closed when not in use.

As shown in FIG. 2, the seat 12 has a hook 20 attached to its lower surface to hook the seat 12 securely to the wire mesh bottom wall of the upper basket of the shopping cart 16.

Stringers 22 are provided at each side of the seat assembly 10 to connect the seat 12 to the back rest 14. The stringers 22 are flexible cords that are under tension when being utilized. The stringers 22 are adjustable in length, but are preferable of a length to permit the back rest 14 to go back to an angle of 115° relative to the seat 12.

The seat 12 and the back rest 14 are preferably formed of hard board that is covered with plastic. Stiffening rods 24 are provided under the plastic covering in seat 12 and stiffening rods 26 are provided under the plastic covering in back rest 14. The stiffening rods 24 and 26 provide rigidity to the assembly. As seen in FIG. 2, the seat 12 is formed of three connected sections 28a, 28b and 28c, and the back rest is formed of three connected sections 30a, 30b and 30c, which permits the seat assembly 10 to be folded along the connections so that it can be readily transported for use.

The seat assembly 10 has a seat belt 32 with a buckle 34 that opens and closes to seat the child. A center strap 36 attached to the front of seat 12 extends between the legs of the child in the seat assembly 10 and buckles into the buckle 34 of seat belt 32 to further secure the child.

The seat belt 32 has a turnbuckle and hook assembly 38 secured to each of its ends. The turnbuckle and hook assemblies 38 are fixed to the seat assembly 10 at the intersection of the seat 12 and back rest 14. When the seat assembly 10 is utilized in a shopping cart, the hook portion of the turnbuckle and hook assembly 38 is hooked into the wire mesh of the bottom wall of the top basket of the shopping cart 16 to secure the seat assembly 10 to the shopping cart 16 and to secure the child in the seat assembly 10.

There are various alternative embodiments that could be contemplated that are not shown. There could be a safety harness that attaches to any place on the shopping cart that securely attaches the child to the shopping cart. There could also be a seat without a back that the attaches to the cart and/or the seat might not have a back or part of the cart structure could be used as the back. While not preferred the seat or harness could also attach anywhere on the shopping cart including the outside or the inside the cart. For example, the seat or harness could attach to the front of a shopping cart where the child or seat is suspended from the front of the shopping cart. Additionally, instead of a seat attaching a portions of the shopping cart could be used as the seat and a back or harness could be attached to the cart that secures the child to the cart and the structure of the cart could be used as the seat.

Various changes could be made in the above-described device without departing from the scope of the invention as defined in the claims below. It is intended that all matter contained in the above description, as shown in the accompanying drawings, shall be interpreted as illustrative and not as a limitation.

10 Portable child safety seat assembly
12 seat
14 back rest
16 standard wire mesh-type shopping cart
18 built in child seat
20 hook (on 12)
22 stringer
24 stiffening rods (in 12)
26 stiffening rods (in 14)
28 a, b, c—sections of 12
30 a, b, c—sections of 14
32 seat belt
34 buckle
36 center strap
38 turnbuckle and hook assembly

I claim:

1. A portable child seat in combination with a standard wire mesh type shopping cart comprising:

(a) a standard wire mesh shopping cart having a top section having a bottom wall;

(b) a seat that lies upon the bottom wall of the top section of the shopping cart, the seat having a rear;

(c) a back rest attached to the rear of the seat and extending in a generally vertical direction from the seat;

(d) stringers attached to the seat and the back rest to prevent the back rest from moving back more than 115° relative to the seat;

(e) a seat belt extending across the seat and attached to the shopping cart and to the seat at an intersection of the seat and the back rest; and (f) a turnbuckle and hook assembly attached to the seat and seat belt and removably hooked to wire mesh of the shopping cart.

2. A portable child seat in combination with a standard wire mesh type shopping cart comprising:

(a) a standard wire mesh shopping cart having a top section having a bottom wall;

(b) a seat that lies upon the bottom wall of the top section of the shopping cart, the seat having a rear;

(c) a back rest attached to the rear of the seat and extending in a generally vertical direction from the seat;

(d) stringers attached to the seat and the back rest to prevent the back rest from moving back more than 115° relative to the seat;

(e) a seat belt extending across the seat and attached to the shopping cart and to the seat at an intersection of the seat and the back rest; and (f) a strap fixed to the seat and buckled into the seat belt.

3. A portable child seat in combination with a standard wire mesh type shopping cart comprising:

(a) a standard wire mesh shopping cart having a top section having a bottom wall;

(b) a seat that lies upon the bottom wall of the top section of the shopping cart and has a hook attached to an underside of the seat to hook the seat to the wire mesh of the shopping cart, the seat having a rear;

(c) a back rest attached to the seat and extending in a generally vertical direction from the seat;

(d) stringers attached to the seat and the back rest to prevent the back rest from moving back more than 115° relative to the seat;

(e) a seat belt extending across the seat and attached to the shopping cart and to the seat at an intersection of the seat and the back rest, the seat belt removably attached to the shopping cart by a turnbuckle and hook assembly removably hooked to the wire mesh of the shopping cart;

(f) a strap fixed to the seat and buckled to the seat belt;

(g) stiffening rods attached to the seat and back rest to provide rigidity; and (h) the seat and the back rest have foldable sections so that the seat and back rest may be folded when not in use.

\* \* \* \* \*